United States Patent [19]
Inagawa et al.

[11] Patent Number: 6,097,587
[45] Date of Patent: Aug. 1, 2000

[54] ELECTRIC DOUBLE LAYER CAPACITOR

[75] Inventors: Masako Inagawa; Yoshiki Inoue, both of Tokyo, Japan

[73] Assignee: NEC Corporation, Tokyo, Japan

[21] Appl. No.: 09/178,830

[22] Filed: Oct. 26, 1998

[30]    Foreign Application Priority Data

Oct. 28, 1997 [JP] Japan ................................. 9-295934

[51] Int. Cl.$^7$ ................................................ H01G 9/155
[52] U.S. Cl. ........................ 361/502; 361/503; 361/512; 361/502
[58] Field of Search .................. 361/502, 503, 361/504, 511, 530, 512

[56]            References Cited

U.S. PATENT DOCUMENTS

| | | | |
|---|---|---|---|
| 3,648,126 | 3/1972 | Boos et al. ................................ | 361/502 |
| 4,480,290 | 10/1984 | Constanti et al. ...................... | 29/25.03 |
| 4,683,639 | 8/1987 | Maesaka et al. ........................ | 361/502 |
| 4,697,224 | 9/1987 | Wantanabe et al. .................... | 361/502 |
| 4,783,723 | 11/1988 | Wantababe et al. .................... | 361/502 |
| 4,954,388 | 9/1990 | Mallouk et al. ......................... | 204/295 |
| 5,065,286 | 11/1991 | Kurabayashi et al. .................. | 361/502 |
| 5,786,981 | 7/1998 | Aoki et al. ............................... | 361/502 |

FOREIGN PATENT DOCUMENTS

| | | |
|---|---|---|
| 57-97613 | 6/1982 | Japan . |
| 4-151816 | 5/1992 | Japan . |
| 4-338623 | 11/1992 | Japan . |
| 6-45191 | 2/1994 | Japan . |

*Primary Examiner*—Dean A. Reichard
*Assistant Examiner*—Eric Thomas
*Attorney, Agent, or Firm*—Young & Thompson

[57]            ABSTRACT

In order to combine improved self discharge characteristics and high reliability under high temperatures, an electric double layer capacitor includes a unit cell or a plurality of stacked unit cells in which each unit cell has a porous separator impregnated with an electrolyte solution, a pair of polarizing electrodes provided on both sides of the porous separator, collectors provided in contact with the external surfaces of the polarizing electrodes, and a gasket provided to seal the electrolyte solution contacting the polarizing electrodes and the porous separator. The porous separator includes two porous separator elements that each have different porosities and that are laminated together.

23 Claims, 6 Drawing Sheets

ELECTRIC DOUBLE LAYER CAPACITOR

BACKGROUND OF THE INVENTION

1. Field of the Invention

The present invention relates to an electric double layer capacitor.

This application is based on Japanese Patent Application No. Hei 9-295934, the contents of which are incorporated herein by reference.

2. Description of Related Art

Figure 7:
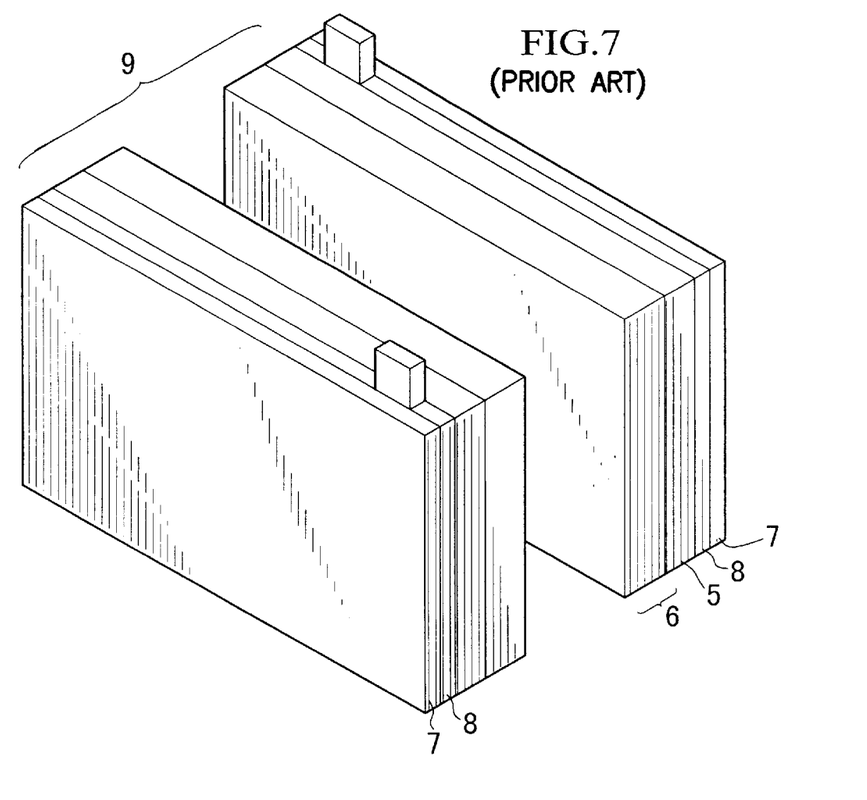
FIG. 7 is a perspective view showing an example of an electric double layer capacitor of the conventional art.
Figure 8:
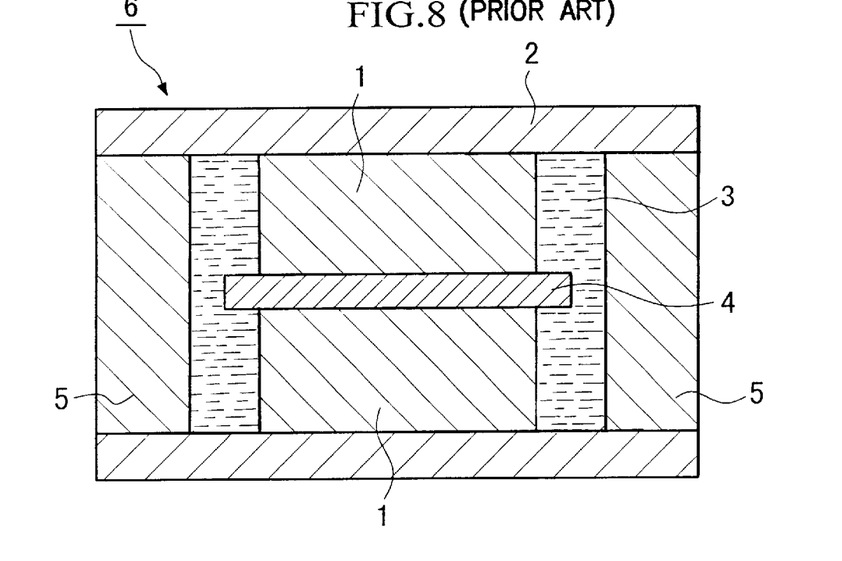
FIG. 8 is a cross sectional view showing a unit cell in the electric double layer capacitor shown in FIG. 7.

An example of a conventional electric double layer capacitor is shown in FIGS. 7 and 8. FIG. 7 is a perspective view of the example of the conventional electric double layer capacitor. FIG. 8 is a cross sectional view showing a structure of the unit cell in the conventional electric double layer capacitor shown in FIG. 7.

In FIG. 8, a solid type activated carbon, for example, an active carbon/polyacene system material, forms a polarizing electrode 1.

A collector 2, which is made of a rubber or a plastic containing conductive carbon, is pressed onto the polarizing electrode 1. A pair of the polarizing electrodes 1 face each other on both sides of a porous separator 4. An electrolyte solution 3 is sealed with both a frame-form gasket 5 and collector 2 shown in FIG. 8. An assembly of the polarizing electrodes 1, the collector 2, the electrolyte solution 3, separator 4, and the gasket 5 makes a unit cell 6.

Since the withstanding voltage of an electric double layer capacitor depends on the electrolysis voltage of the electrolyte solution 3, a plurality of unit cells 6 are connected in series according to a desired withstanding voltage. Furthermore, the unit cells 6 are held between terminal electrodes 8 by pressing loading plates 7 on the external sides of the terminal electrodes as shown in FIG. 7 in order to reduce the degree of contact resistance. A cell stack 9 consists of a plurality of unit cells.

In recent years, several properties of electric double layer capacitors have been improved, such as increased capacity of the capacitor and reduced equivalent series resistance (which is hereinafter called "ESR") by using the polarizing electrodes 1, and thereby, new uses for these capacitors have been discovered, and practical applications are currently being studied. Electric double layer capacitors are used, for example, to form part of a power supply for driving a starter motor of an automobile in combination with a lead battery, or as an auxiliary power supply in combination with a solar battery or the like.

Electric double layer capacitors will probably be subjected to high temperature conditions, therefore, it is necessary to ensure their reliability under such conditions. At the same time, it is necessary to minimize their self-discharge.

In conventional electric double layer capacitors, if porosity of the separator 4 is reduced in order to improve their self discharge characteristics (which is hereinafter called "SD characteristics"), the amount of the electrolyte solution 3 which is retained in the unit cell 6 is reduced. If the capacitor with reduced amount of the electrolyte solution 3 is preserved under high temperature conditions, the amount of the electrolyte solution 3 held in the unit cell 6 will be gradually reduced by vaporization, that is to say, a "dry up phenomenon" occurs. Consequently, the electrostatic capacity of the capacitor will be reduced and the ESR will increase, which result in deteriotation of the reliability. Therefore, it is desirable to increase the porosity in the separator 4 as large as possible for retaining the electrolyte solution 3 as much as possible in the separator 4, in order to ensure reliability.

However, increased porosity of the separator 4 to ensure reliability will also increase the amount of the electrolyte solution 3 which is retained in the separator 4, and as a result, self discharge will tend to occur, and as a result, unfavorable SD characteristics will be encoutered. Therefore, from the point of view of SD characteristics, it is desirable that the porosity of the separator 4 should be as small as possible and the holding amount of the electrolyte solution 3 should be reduced.

As hereinabove described, the requirements for ensuring reliability under high temperature conditions are contrary to the requirements for improving the SD characteristics.

Figure 9:
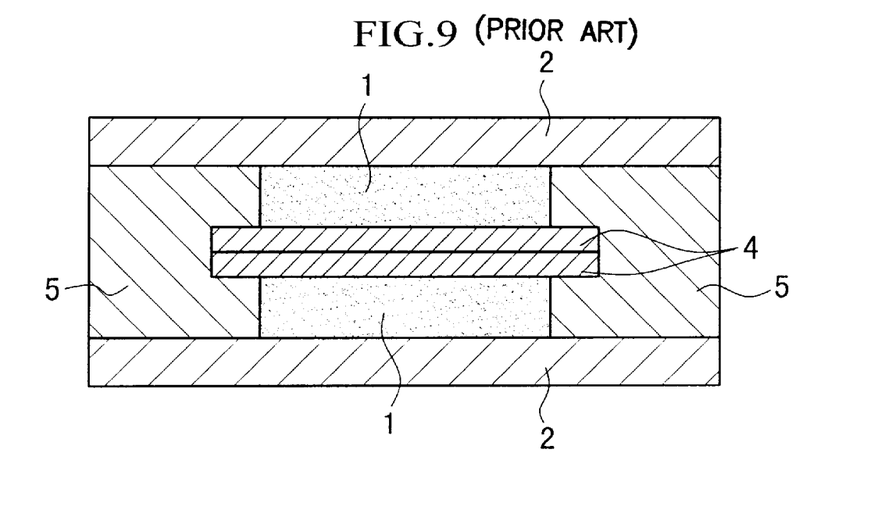
FIG. 9 is a cross sectional view showing another example of an electric double layer capacitor of the conventional art.

Furthermore, an electric double layer capacitor such as the capacitor shown in FIG. 9 is disclosed in Japanese Patent Application, First Publication, Hei 6-45191. The above application discloses that two porous sheets made of the same material are attached so as to form a separator. The above application is made so as to improve the mechanical strength of the porous separator to withstand pressure from both ends.

Japanese Patent Application, First Publication, Sho 57-97613 discloses a technique, similar to the above publication, to attach two sheets made of the same material so as to form the separator.

Furthermore, Japanese Patent Application, First Publication, Hei 4-338623 discloses an Example of attaching two sheets made of the same melt-plain nonwoven fabric for forming separators.

In the above-mentioned techniques for attaching two sheets made of the same material to each other, the increase in the amount of electrolyte solution held in the separator improves the reliability under high temperatures, but degrades the SD characteristics.

On the other hand, if two sheets with low porosity are attached to form a separator in order to improve the SD characteristics, the reliability under high temperatures is reduced.

Therefore, maintaining high reliability and improving the SD characteristics under high temperature conditions are contrary to each other, and both cannot be achieved at the same time.

Figure 10:
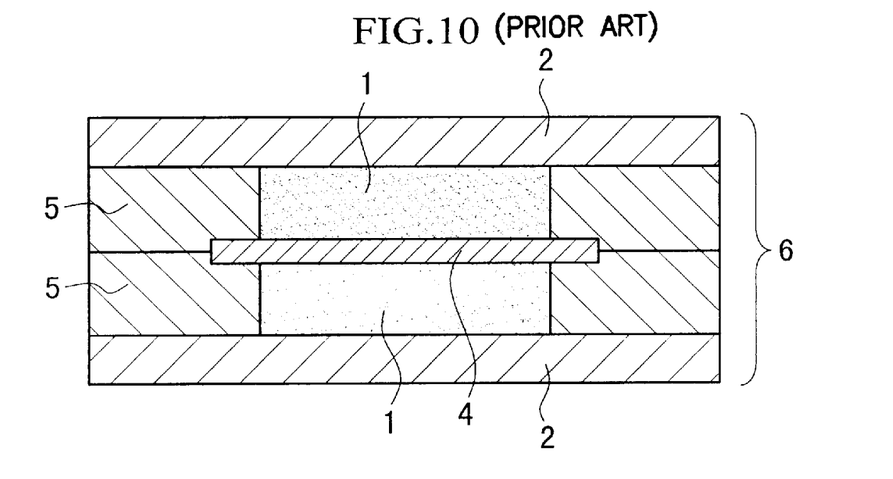
FIG. 10 is a cross sectional view showing more another example of an electric double layer capacitor of the conventional art.
Figure 11:
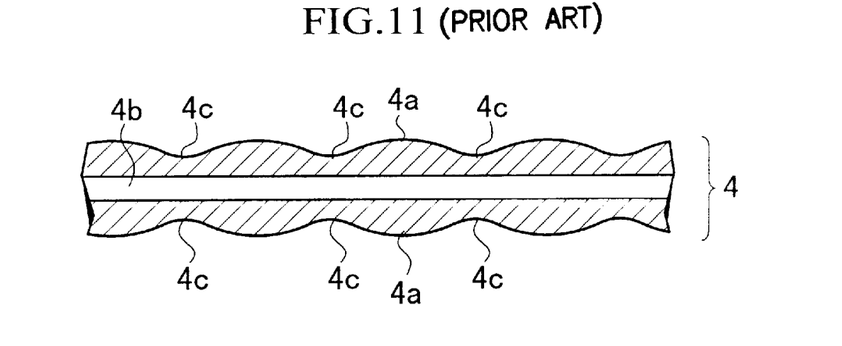
FIG. 11 is an enlarged cross sectional view showing a unit cell in an electric double layer capacitor shown in FIG. 10.

Furthermore, Japanese Patent Application, First Publication, Hei 4-151816, discloses an electric double layer capacitor comprising the unit cell containing structure shown in FIG. 10.

In the technique recited in the above-mentioned application, a separator 4 has a structure wherein a high-hydrophilic fiber 4a based on acrylic resin is laminated on both sides of a porous separator main body 4b by thermocompressing the high-hydrophilic fibers 4a at thermocompression bonding portions 4c at intervals of 5 mm.

It is expected by using the above structure, to improve both the water retentivity of the electrolyte solution, and the reliability under high temperatures.

However, since the high-hydrophilic fiber 4a are laminated at thermocompression bonding portions 4c by thermocompression bonding, this requires strict control of the manufacturing conditions, for example, the temperature when the porous separator main body 4b is thermocompressed to the high-hydrophilic fibers 4a and the pressure for thermocompression bonding. Therefore, if the temperature or pressure for the thermocompression bonding is too high, the pores in the porous separator main body 4b may collapse or the high-hydrophilic fiber may be torn, and the tears may make pinholes. On the other hand, if the temperature or pressure is too low, thermocompression bonding is difficult. As a result, unit cells containing the electric double layer capacitor according to the above-mentioned application cannot be produced with high reliablity.

Additionally, at the thermocompression bonding portions 4c, the pores in the thermocompressed high-hydrophilic fiber 4a completely collapse. Therefore, it is impossible to prevent reduction of the water retentivity of the electrolyte solution, and the effect of improvement of reliability under high temperature is reduced.

SUMMARY OF THE INVENTION

In light of the above-mentioned conditions, the present invention has an object of providing the electric double layer capacitor which has superior SD characteristics and high reliability under high temperature conditions.

A first embodiment of the present invention is an electric double layer capacitor comprising a unit cell or a plurality of stacked unit cells, said unit cell having: a porous separator impregnated with an electrolyte solution, a pair of polarizing electrodes provided on both sides of said porous separator, collectors provided in contact with the external surfaces of said polarizing electrodes, and a gasket provided to seal the electrolyte solution contacting said polarizing electrodes and said porous separator; that is, said gasket is provided to surround the circumference of said polarizing electrodes to seal in the electrolytic solution, wherein said porous separator comprises two or more porous separator elements laminated together, in which at least one of said porous separator elements has a porosity which differs from that of the others.

A second embodiment of the present invention is an electric double layer capacitor comprising a unit cell or a plurality of stacked unit cells, said unit cell having: a porous separator impregnated with an electrolyte solution, a pair of polarizing electrodes provided on both sides of said porous separator, collectors provided in contact with the external surfaces of said polarizing electrodes, and a gasket provided to seal the electrolyte solution contacting said polarizing electrodes and said porous separator; that is, said gasket is provided to surround the circumference of said polarizing electrodes to seal in the electrolytic solution, wherein said porous separator comprises two or more porous separator elements laminated together in which at least one of said porous separator elements has a hydrophilicity which differs from that of the others.

A third embodiment of the present invention is an electric double layer capacitor comprising a unit cell or a plurality of stacked unit cells, said unit cell having: a porous separator impregnated with an electrolyte solution, a pair of polarizing electrodes provided on both sides of said porous separator, collectors provided in contact with the external surfaces of said polarizing electrodes, and a gasket provided to seal the electrolyte solution contacting said polarizing electrodes and said porous separator; that is, said gasket is provided to surround the circumference of said polarizing electrodes to seal in the electrolytic solution, wherein said porous separator comprises two or more porous separator elements laminated together in which at least one of said porous separator elements is made of a material which differs from that of the others.

A forth embodiment of the present invention is an electric double layer capacitor comprising a unit cell or a plurality of stacked unit cells, said unit cell having: a first polarizing electrode having a side on which at least one layer of an insulating material is provided, a second polarizing electrode having a side on which at least one layer of an insulating material other than said insulating material of said first polarizing electrode is provided, the sides of said first and second polarizing electrodes on which said insulating materials are provided facing each other, collectors provided in contact with the external surfaces of said first and second porous electrodes, and a gasket provided to seal the electrolyte solution contacting said first and second polarizing electrodes; that is, said gasket is provided to surround the circumference of said first and second polarizing electrodes to seal in the electrolyte solution.

A fifth embodiment of the present invention is an electric double layer capacitor comprising a unit cell or a plurality of stacked unit cells, said unit cell having: a first polarizing electrode having a side on which at least one layer of an insulating material is provided, a porous separator impregnated with an electrolyte solution, said porous separator being provided in contact with the side of said insulating material which is provided on said first polarizing electrode, a second polarizing electrode having a side in contact with said porous separator whereby said insulating material and said separator are positioned between said first and second polarizing electrodes, collectors provided in contact with the external surfaces of said first and second porous electrodes, and a gasket is provided to seal the electrolyte solution contacting said first and second polarizing electrodes; that is, said gasket is provided to surround the circumference of said first and second polarizing electrodes to seal in the electrolyte solution therein.

In the above-mentioned first to fifth embodiments, a hole may be formed in said polarizing electrodes.

In addition, said hole may have a diameter of not less than 100 $\mu$m.

In addition, said hole may pass through said polarizing electrodes in the direction in which said pair of polarizing electrodes face each other.

In addition, said hole may be filled with an auxiliary electrolytic solution which is selected from the group consisting of a gel electrolyte solution and a hydrophilic polymer.

In an electric double layer capacitor under high temperature, since the electrolyte solution impregnated mainly in the separator passes through a portion of a gasket and a collector which tightly contact each other, the electrolyte solution escapes outside the separator and evaporates, therefore, a dry up phenomenon occurs. The small amounts of electrolyte solution kept in the unit cells make it difficult to ensure reliability.

Furthermore, when an electric double layer capacitor is left in an open state after a voltage is applied over a period of time, ions which form the double layer migrate to the outside of the separator through the holes of the separator. Accordingly, the holding voltage gradually decreases (self discharge phenomenon). Therefore, it is necessary to reduce the porosity and hydrophilicity of the separator in order to improve the SD characteristics (self discharge characteristics).

As a result of the above, as previously stated, maintaining the reliability, and improving the SD characteristics under high temperature conditions are contrary to each other.

According to the first embodiment of the present invention, the porous separator consists of two or more porous separator elements, laminated together, in which at least one of the porous elements has a porosity which differs from that of the others. Since at least one separator element has lower porosity than the others, ionic migration is controlled, and therefore, the SD characteristics are improved. Furthermore, since at least one other separator element has a higher porosity than the others, the holding amount of electrolyte solution is increased, therefore, the dry up phenomenon is effectively prevented, and as a result, reliability under high temperature conditions is guaranteed.

According to the second embodiment of the present invention, the porous separator consists of two or more porous elements laminated together, in which at least one of the porous elements has a hydrophilicity which differs from that of the others. Since at least one porous separator element has a lower hydrophilicity than the others, ionic migration is controlled, and therefore, the SD characteristics are improved. Furthermore, since at least one other separator element has a higher hydrophilicity than the others, the holding amount of electrolyte solution is increased, therefore, the dry up phenomenon is effectively prevented, and as a result, reliability under high temperature conditions is guaranteed.

According to the third embodiment of the present invention, the porous separator consists of two or more porous elements laminated together, in which at least one of the porous elements is made of a material which differs from that of the others. Since at least one separator element is made of a material which has a lower performance for holding electrolyte solution than the others, ionic migration is controlled, and therefore, the SD characteristics are improved. Furthermore, since at least one other separator element is made of a material which has a higher performance for holding electrolyte solution than the others, the holding amount of electrolyte solution is increased, therefore, the dry up phenomenon is effectively prevented, and as a result, reliability under high temperature conditions is guaranteed.

According to the forth embodiment of the present invention, the insulating materials are made of each different materials, which are installed at a pair of polarizing electrodes respectively, are provided between the polarizing electrodes. Since the porosity or hydrophilicity of one insulating material is reduced, ionic migration is controlled, and therefore, the SD characteristics are improved. Furthermore, since the porosity or hydrophilicity of the other insulating material is increased, the holding amount of electrolyte solution is increased, therefore, reliability under high temperature conditions is guaranteed.

According to the fifth embodiment of the present invention, insulating materials, which are installed at one of the pair of polarizing electrodes, and a separator, are provided between the polarizing electrodes. Since the porosity or hydrophilicity of one of the insulating material and separator is reduced, ionic migration is controlled, and therefore, the SD characteristics are improved. Furthermore, since porosity or hydrophilicity of one of the other insulating material and separator is increased, the holding amount of electrolyte solution is increased, therefore, reliability under high temperature conditions is guaranteed.

In addition, when a hole is formed in the polarizing electrodes, the holding amount of electrolyte solution in the hole is increased, and therefore, reliability under high temperature conditions is guaranteed.

Furthermore, when the hole has a diameter of not less than 100 $\mu$m, the holding amount of electrolyte solution is further increased, and therefore, reliability under high temperature condition is guaranteed.

Furthermore, when the hole passes through the polarizing electrodes in the direction in which the pair of polarizing electrodes face each other, since the hole is directly communicated with the separator, the separator is effectively provided the electrolyte solution. Additionally, since the hole is provided in the direction in which the pair of polarizing electrodes face each other, mechanical strength of the polarizing electrodes decreases very little when the polarizing electrodes are pressed in the direction in which the pair of polarizing electrodes face each other.

Moreover, the hole provided in the polarizing electrodes is filled with an auxiliary electrolytic solution which is selected from the group consisting of a gel electrolyte solution and a hydrophilic polymer. Therefore, the electrolyte solution is more effectively provided to the separators.

DESCRIPTION OF THE PREFERRED EMBODIMENTS

The following are explanations of embodiments of the present invention with reference to the figures.

EMBODIMENT 1

Figure 1:
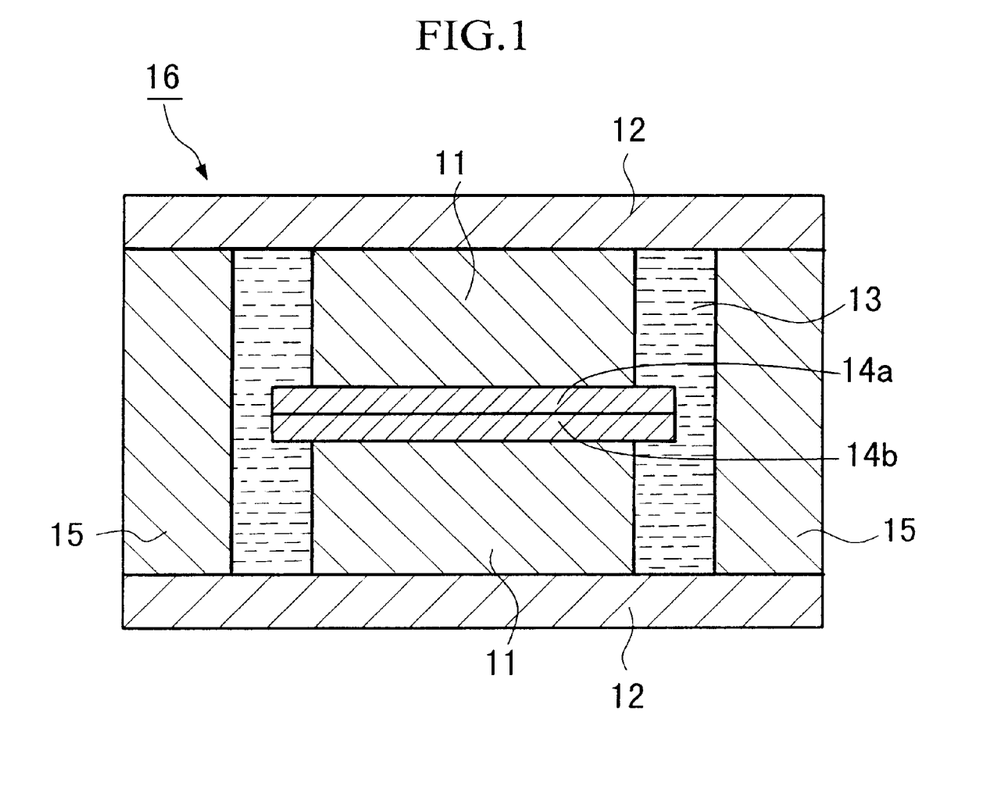
FIG. 1 is a cross sectional view showing a first embodiment of the unit cell in the electric double layer capacitor of the present invention.

FIG. 1 shows an embodiment of a unit cell 16 in the electric double layer capacitor of the present invention.

In FIG. 1, polarizing electrode 11 is made of block-shaped activated carbon made by, for example, baking a mixture of binder like phenol resin, and powdered activated carbon. The binder is chosen as appropriate without being limited only to the above-mentioned type and method. A pair of the polarizing electrodes 11, 11 face each other on both sides of a separator made of porous sheets 14a, 14b that are attached to each other and impregnated with electrolyte solution 13.

A collector 12, which is, for example, a butyl rubber sheet into which carbon powder or the like is kneaded, is provided in contact with the outer surfaces of the polarizing electrodes 11. The material of the collector 12 can be chosen as appropriate, without being limited to the above-mentioned material.

The electrolyte solution 13, which is, for example, an aqueous electrolyte solution such as sulfuric acid, is used. The material of porous sheets 14a, 14b can be chosen as appropriate, as long as the material is a non-conductive and ionic permeable membrane. In this case, the porous sheets 14a, 14b made of glass fiber for lead batteries is used. The sheets 14a and 14b have different porosities from each other, that is to say, one sheet has a relatively high porosity and another has a relatively low porosity.

Furthermore, in the present embodiment, only two porous sheets are used, however, in the present invention, three or more sheets may be used. In the case, a separator having high porosity may be provided between two sheets having the same low porosity.

A gasket 15 holds and seals the polarizing electrodes 11, the collector 12, the porous sheets 14a, 14b, and electrolyte solution 13. The gasket 15 is made from insulating material such as a plastic, in this case, an ABS resin having heat resistance is used. The material of gasket 15 can be chosen as appropriate, without being limited to the above-mentioned material.

It is shown in FIG. 1 that the unit cell 16 of the electric double layer capacitor is obtained in the following sequence: a pair of polarizing electrodes 11, 11 are provided on both outer surfaces of the sheets 14a and 14b, said structure is provided in the gasket 15, and is impregnated with the electrolyte solution 13, and the collectors 12, 12 are provided on both sides of said structure in the gasket.

Furthermore, after a predetermined number of the unit cell 16 are stacked in series, two cell layered products are electrically connected on both sides of a terminal electrode in parallel, a loading plate is provided in contact with the outer surfaces of the terminal electrodes, and as a result, the electric double layer capacitor is obtained.

The dimensions of the polarizing electrode 11 are 70 (L)×50 (W)×1 (t) mm. The inner dimensions of the gasket 15 are 74 (L)×54 (W)×2.2 (t) mm. The dimensions of each of sheets 14a, 14b are 70 (L)×50 (W)×0.1 (t) mm. The porosity of sheet 14a is 35% and that of sheet 14b is 70%.

There are 18 such unit cell 16 which are layered in series, thus a cell layered product having a withstand voltage of 15V was prepared. The concentration of dilute sulfuric acid, which was used as the electrolyte solution 13, was 30% by weight. The polarizing electrodes 11, 11 were prepared by the following steps: mixing powdered active carbon containing phenol and powdered phenol resin in a ratio by weight of 70 to 30 respectively, grinding the mixture, granulating the ground mixture, and baking the granulated mixture.

Additionally, the above-mentioned embodiment 1 may be modified as follows:

Modification 1-1

The porous sheets 14a, 14b have different hydrophilicities from each other. The holding amount of the electrolyte solution in the sheet 14a is 150% and that in the sheet 14b is 50%.

Modification 1-2

The porous sheets 14a, 14b are made of different materials from each other. The sheet 14a is made of glass fiber, the sheet 14b is made of polypropylene resin.

EMBODIMENT 2

Figure 2:
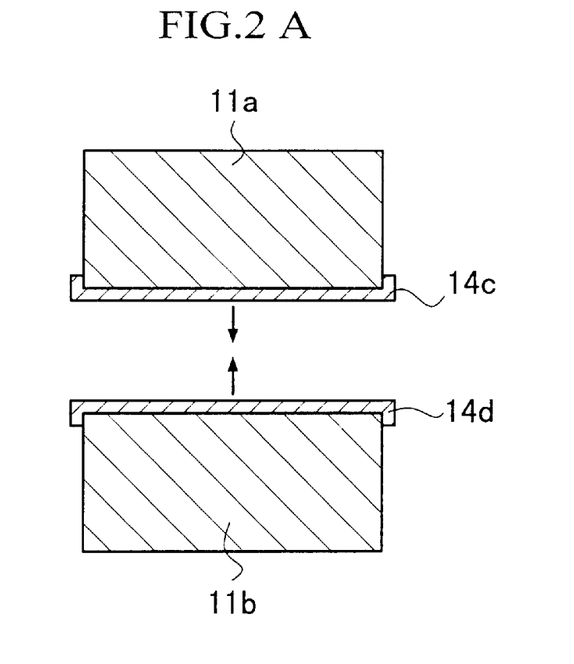
FIG. 2A is a cross sectional view showing a second embodiment of the polarizing electrodes in the electric double layer capacitor of the present invention.
FIG. 2B is a cross sectional view showing a second embodiment of the unit cell in the electric double layer capacitor of the present invention.

FIG. 2B shows the second embodiment of a unit cell 16 in the electric double layer capacitor of the present invention.

As shown in FIG. 2A in the present embodiment, insulating layer 14c is applied on one side of the polarizing electrode 11a and that side is baked. Similarly, insulating layer 14d made of a different material from the insulating layer 14c is applied on one side of the polarizing electrode 11b and that side is baked. The polarizing electrodes 11a and 11b are provided by making the baked side of the insulating layer 14c and that of the insulating layer 14d face each other.

In the present embodiment, the only difference between the embodiment 1 and the present embodiment 2 is in the use of the insulating layers 14c, 14d in the present embodiment 2 in place of the sheets 14a, 14b in the embodiment 1. The manufacturing conditions, and the method of making the electric double layer capacitor, except for the above point, are the same as those of the embodiment 1.

The dimensions of the polarizing electrode 11a, 11b are 70 (L)×50 (W)×1 (t) mm. The thickness of the insulating layer 14c, which is made by baking polypropylene, is 100 μm. The thickness of the insulating layer 14d, which is made by baking glass fiber, is 100 μm. The inner dimensions of the gasket 15 are 74 (L)×54 (W)×2.2 (t) mm. There are 18 such unit cells 16 which are layered in series, the same as in embodiment 1, thus a cell layered product having a withstand voltage of 15V was prepared. Furthermore, the type of electrolyte solution 13 and the material of the polarizing electrodes 11a, 11b are the same as those of embodiment 1.

EMBODIMENT 3

Figure 3:
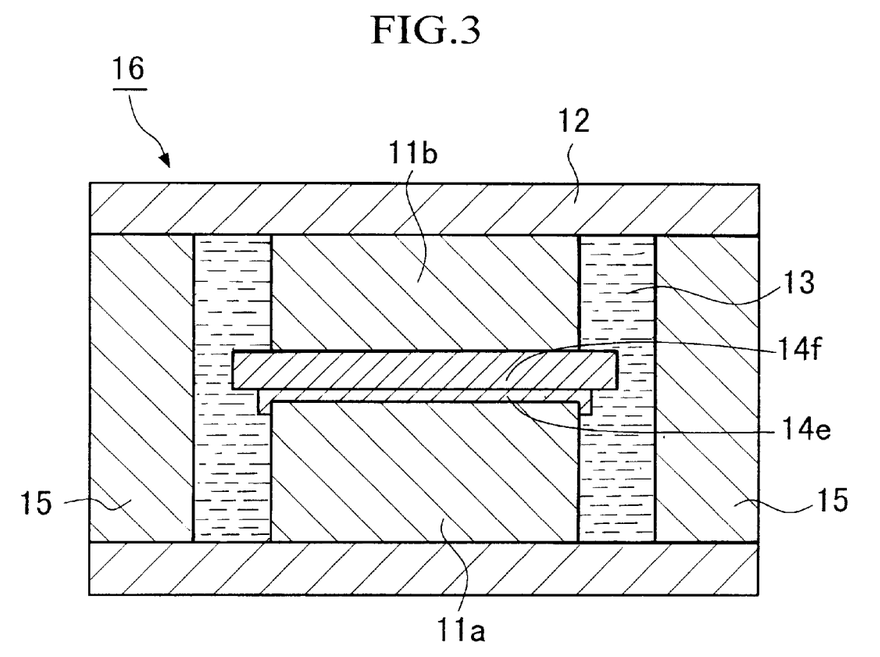
FIG. 3 is a cross sectional view showing a third embodiment of the unit cell in the electric double layer capacitor of the present invention.

FIG. 3 shows the third embodiment of a unit cell 16 in the electric double layer capacitor of the present invention.

In the present embodiment, an insulating layer 14e and a separator 14f are provided between the pair of polarizing electrodes 11a and 11b. The insulating layer 14e, for example, polypropylene, is applied on a side of the polarizing electrode 11a and that side is baked. The separator 14f is made of glass fiber.

The materials and manufacturing conditions and methods used in making the electric double layer capacitor are the same as those of the above embodiments 1 and 2.

The dimensions of the polarizing electrode 11a, 11b are 70 (L)×50 (W)×1 (t) mm. The thickness of the insulating layer 14e is 100 μm. The dimensions of the separator 14f are 70 (L)×50 (W)×0.1 (t) mm. Furthermore, the type of electrolyte solution 13, the gasket 15, and the collector 12 are the same as those of embodiment 1.

EMBODIMENT 4

Figure 4:
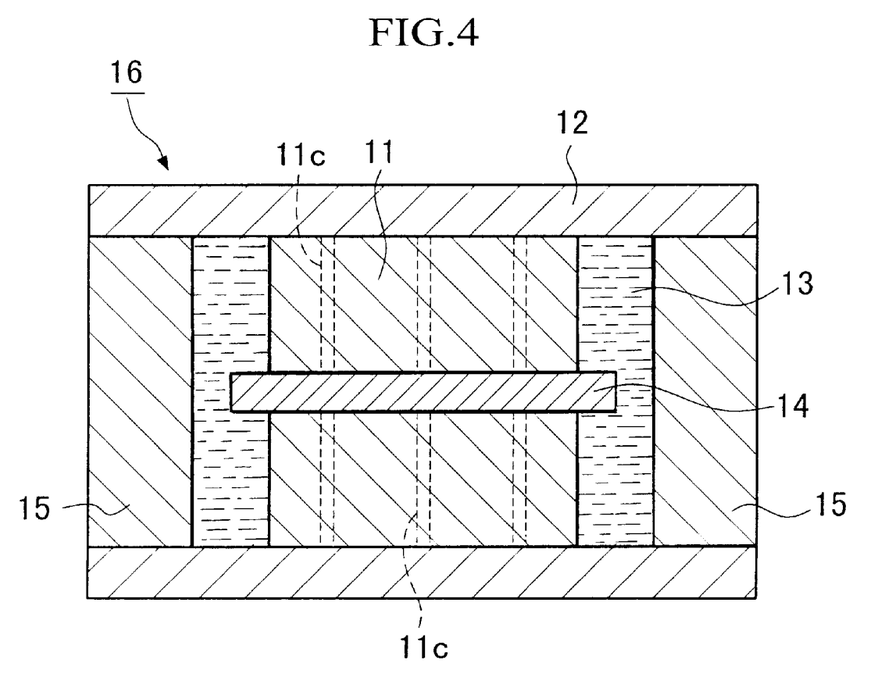
FIG. 4 is a cross sectional view showing a fourth embodiment of the unit cell in the electric double layer capacitor of the present invention.

FIG. 4 shows the fourth embodiment of a unit cell 16 in the electric double layer capacitor of the present invention.

The materials and manufacturing conditions and the method used in making the electric double layer capacitor are the same as those of the above embodiments 1 to 3.

The dimensions of the polarizing electrode 11 are 70 (L)×50 (W)×1 (t) mm. There are 50 holes 11c which are formed by penetrating through the inside of the polarizing electrode 11 in the direction in which the pair of polarizing electrodes face each other (the same direction in which a plurality of the unit cells 16 are stacked). Holes 11c of different diameters, of φ95 μm, φ100 μm, φ105 μm, φ110 μm, and φ120 μm, were made.

Furthermore, the electrolyte solution 13 and the gasket 15 used the same as in the above embodiments 1 to 3. Additionally, the dimensions of the separator 14, which is made of polypropylene, are 70 (L)×50 (W)×0.1 (t) mm.

Moreover, the above-mentioned embodiment 4 may be modified as follows:

Modification 4-1

Figure 5:
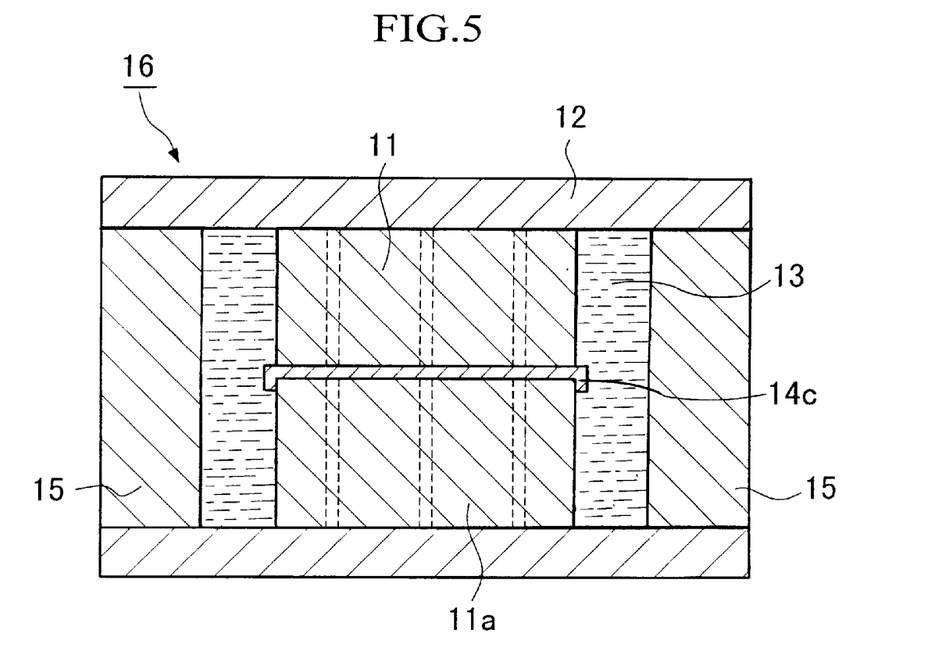
FIG. 5 is a cross sectional view showing a modification of the fourth embodiment of the unit cell in the electric double layer capacitor of the present invention.

In place of the separator 14, an insulating layer 14c is prepared by applying polypropylene on the one polarizing electrode 11a (which see FIG. 5). All the holes 11c have the same diameter of φ100 μm.

Comparative Example

Figure 6:
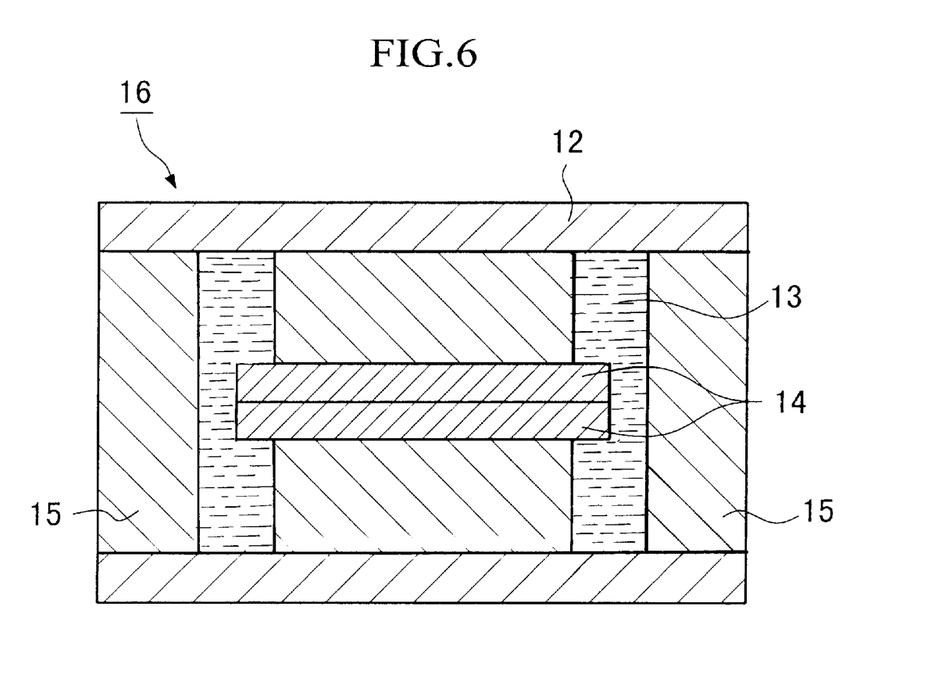
FIG. 6 is a cross sectional view showing a comparative example of the fourth embodiment of the unit cell in the electric double layer capacitor of the present invention.

FIG. 6 shows a comparative example for a unit cell 16 in the electric double layer capacitor of the present invention.

Each separator containing the same material and property (at least having the same porosity and hydrophilicity) were laminated in the comparative example. For example, two sheets 14, 14 made of glass fiber were laminated. Other parts except the sheets in the electric double layer capacitor were prepared of the same material, shape, and manufacturing method as in the above embodiments.

Furthermore, the above-mentioned comparative example may be modified as follows:

Modification C-1

In place of the above sheets 14, 14 made of glass fiber which have the same properties, sheets made of polypropylene which have the same properties are prepared.

Modification C-2

In addition to the above sheets 14, 14 made of polypropylene, both sides of the sheets made of polypropylene are laminated with acrylic resin applied by thermocompression bonding at intervals of 5 mm (not illustrated).

With regard to the electric double layer capacitor of the above-mentioned embodiments 1 to 4 and that of the above comparative example, the results of the reliability test and the SD characteristics are as follows.

The reliability test was carried out under conditions in which 15 V was applied to the capacitor at a temperature of 70 degrees centigrade, and the capacitor was left for 1000 hours, and thereafter, fully discharged. Then, the electrostatic capacity of the capacitor was measured, and ΔC/C (%), i.e., the variation of the electrostatic capacity ΔC compared to its initial value C, and ΔE/E (%), i.e., the variation ΔE of the ESR compared to its initial value E, were calculated. The ESR was the measured impedance at a 1 kHz test signal frequency by an alternating current four terminal method, and the ESR value was obtained by calculating a real number part.

The SD characteristic was determined by calculating a voltage decrease rate ΔV/V (%) after the capacitor was kept in an open state for 12 after application of 15V to the capacitor for 12 at ordinary temperature. Furthermore, there were 30 samples for each example which was measured with the use of the above measuring methods, and mean value for each example were obtained. The results are shown in Table 1.

TABLE 1

|  | HOLE DIAMETER | ΔC/C (%) | ΔE/E (%) | ΔV/V (%) |
| --- | --- | --- | --- | --- |
| Embodiment 1 | — | −12.5 | 10.8 | −6.4 |
| Modification 1-1 | — | −10.9 | 14.7 | −7.6 |
| Modification 1-2 | — | −16.8 | 12.3 | −1.8 |

TABLE 1-continued

|  | HOLE DIAMETER | ΔC/C (%) | ΔE/E (%) | ΔV/V (%) |
| --- | --- | --- | --- | --- |
| Embodiment 2 | — | −22.8 | 10.1 | −4.8 |
| Embodiment 3 | — | −17.2 | 9.9 | −5.1 |
| Embodiment 4 | φ95 μm | −69.4 | 89.3 | −3.4 |
|  | φ100 μm | −14.8 | 36.7 | −3.2 |
|  | φ105 μm | −8.9 | 3.8 | −3.2 |
|  | φ110 μm | −6.3 | 4.0 | −3.3 |
|  | φ120 μm | −2.5 | 3.6 | −3.1 |
| Modification 4-1 | φ100 μm | −13.4 | 10.5 | −3.2 |
| Comparative Example |  | −3.8 | 4.1 | −48.8 |
| Modification C-1 |  | −59.9 | 79.8 | −2.0 |
| Modification C-2 |  | −18.3 | 10.3 | −25.1 |

As shown in Table 1, the capacitors comprising the unit cell having a separator made of laminating two glass fiber sheets (comparative example) and thermocompression bonding parts of acrylic resin (modification C-2) have poor SD characteristics.

Furthermore, in the case that two polypropylene sheets having low porosity are simply laminated (modification C-1), while SD characteristic is improved, the reliability under high temperature is reduced.

In comparison with the above, the electric double layer capacitor of the present embodiments shown in Table 1 had the following results: (1) ΔC/C (%), the electrostatic capacity variation ratio, was in the range of −2.5 to −22.8 and (2)ΔE/E (%), the ESR variation ratio, was small, therefore, the capacitor shows high stability. Moreover, the voltage decrease rate was also small, therefore, the capacitor shows high stability.

However, the unit cell having a φ95 μm hole diameter in embodiment 4 did not show preferable results. If the unit cell has a φ95 μm hole diameter, in the reliability test, since the amount of the leakage is the same as or more than the amount of electrolyte solution held in the hole, the ΔE/E increases, therefore, the reliability decreases.

If the desired effect is not obtained because the hole diameter is too small, increasing the hole number prevents a decrease in reliability.

In view of the mechanical strength of the polarizing electrodes, in the case that it is not desired to increase the hole diameter, or the number of holes, a gel-state electrolyte solution, absorptive polymer, or the like is filled into the holes, therefore, the filled holes increase the holding capacity of electrolyte solution in holes.

Furthermore, ΔV/V in modification C-2 had a high value as shown in Table 1. To investigate the above disadvantage, the separator was observed with a microscope after the above tests, and cracking was found on the thermocompression bonding part. It seems probable that the cracking caused acceleration of the ionic migration and an increase of ΔV/V. The above shows that manufacturing the separator by modification C-2 is difficult. Furthermore, even if the separator is successfully manufactured in modification C-2, the thermocompression bonding parts are formed at isolated locations on the separator, and it could be presumed that mechanical stress will tend to concentrate on the thermocompression bonding parts, therefore, cracking would tend to occur on the thermocompression bonding parts.

What is claimed is:

1. An electric double layer capacitor having at least one unit cell that comprises:

a porous separator impregnated with an electrolyte solution, a pair of polarizing electrodes provided on both sides of said porous separator, collectors provided in contact with the external surfaces of said polarizing electrodes, and a gasket provided to seal an electrolyte solution contacting said polarizing electrodes and said porous separator, wherein said porous separator comprises two or more porous separator elements that are each impregnated with the electrolyte solution and laminated together, in which at least one of said porous separator elements has a porosity different from a porosity of another one of said porous separator elements.

2. The electric double layer capacitor of claim 1, wherein said porous separator elements each has a different hydrophilicity.

3. An electric double layer capacitor according to claim 2, wherein a hole is formed in at least one of said polarizing electrodes.

4. An electric double layer capacitor according to claim 3, wherein said hole has a diameter of not less than 100 $\mu$m.

5. An electric double layer capacitor according to claim 3, wherein said hole passes through said one polarizing electrode in a direction generally perpendicular to said collectors.

6. The electric double layer capacitor of claim 1, wherein said porous separator elements are made of different materials.

7. An electric double layer capacitor according to claim 6, wherein a hole is formed in at least one of said polarizing electrodes.

8. An electric double layer capacitor according to claim 7, wherein said hole has a diameter of not less than 100 $\mu$m.

9. An electric double layer capacitor according to claim 7, wherein said hole passes through said one polarizing electrode in a direction generally perpendicular to said collectors.

10. An electric double layer capacitor according to claim 1, wherein a hole is formed in at least one of said polarizing electrodes.

11. An electric double layer capacitor according to claim 10, wherein said hole has a diameter of not less than 100 $\mu$m.

12. An electric double layer capacitor according to claim 10, wherein said hole passes through said one polarizing electrode in a direction generally perpendicular to said collectors.

13. An electric double layer capacitor according to claim 10, wherein said hole is filled with an auxiliary electrolytic solution which is selected from the group consisting of a gel electrolyte solution and a hydrophilic polymer.

14. The electric double layer capacitor of claim 1, wherein each of said porous separator elements comprises glass fibers.

15. The electric double layer capacitor of claim 1, wherein one of said porous separator elements comprises glass fibers and another of said porous separator elements comprises polypropylene resin.

16. An electric double layer capacitor having at least one unit cell that comprises:

a first polarizing electrode having a side on which at least one layer of an insulating material is provided, a second polarizing electrode having a side on which at least one layer of an insulating material other than said insulating material of said first polarizing electrode is provided, and the sides of said first and second polarizing electrodes on which said insulating materials are provided face each other, collectors provided in contact with the external surfaces of said first and second polarizing electrodes, and a gasket provided to seal an electrolyte solution contacting said first and second polarizing electrodes, said first and second polarizing electrodes each have at least one through hole that extends from the respective said insulating material to the respective said collector, said holes being filled with an auxiliary electrolytic solution which is selected from the group consisting of a gel electrolyte solution and a hydrophilic polymer.

17. An electric double layer capacitor according to claim 16, wherein said holes have a diameter of not less than 100 $\mu$m.

18. An electric double layer capacitor according to claim 16, wherein said holes pass through said polarizing electrodes in a direction generally perpendicular to said collectors.

19. An electric double layer capacitor having at least one unit cell that comprises:

a first polarizing electrode having a side on which at least one layer of an insulating material is provided, a porous separator impregnated with an electrolyte solution, said porous separator being provided in contact with a side of said insulating material which is provided on said first polarizing electrode, a second polarizing electrode having a side in contact with said porous separator whereby said insulating material and said separator are positioned between said first and second polarizing electrodes, collectors provided in contact with the external surfaces of said first and second polarizing electrodes, and a gasket provided to seal an electrolyte solution contacting said first and second polarizing electrodes said first and second polarizing electrodes each having holes therethrough that are filled with an auxiliary electrolytic solution which is selected from the group consisting of a gel electrolyte solution and a hydrophilic polymer.

20. An electric double layer capacitor according to claim 19, wherein said holes have a diameter of not less than 100 $\mu$m.

21. An electric double layer capacitor according to claim 19, wherein said holes pass through said polarizing electrodes in a direction generally perpendicular to said collectors.

22. An electric double layer capacitor having at least one unit cell that comprises:

a porous separator impregnated with an electrolyte solution, a pair of polarizing electrodes provided on both sides of said porous separator, collectors provided in contact with the external surfaces of said polarizing electrodes, and a gasket provided to seal an electrolyte solution contacting said polarizing electrodes and said porous separator, wherein said porous separator comprises two or more porous separator elements laminated together in which at least one of said porous separator elements each has a different hydrophilicity, and wherein a hole is formed in said polarizing electrodes that is filled with an auxiliary electrolytic solution which is selected from the group consisting of a gel electrolyte solution and a hydrophilic polymer.

23. An electric double layer capacitor having at least one unit cell that comprises:

a porous separator impregnated with an electrolyte solution, a pair of polarizing electrodes provided on both sides of said porous separator, collectors provided in contact with the external surfaces of said polarizing electrodes, and a gasket provided to seal an electrolyte solution contacting said polarizing electrodes and said porous separator, wherein said porous separator comprises two or more porous separator elements laminated together in which at least one of said porous separator elements are made of different materials, and wherein a hole is formed in said polarizing electrodes that is filled with an auxiliary electrolytic solution which is selected from the group consisting of a gel electrolyte solution and a hydrophilic polymer.

* * * * *